(12) United States Patent
Ye (10) Patent No.: US 12,223,702 B2
(45) Date of Patent: Feb. 11, 2025

(54) TARGET DETECTION SYSTEM SUITABLE FOR EMBEDDED DEVICE

(71) Applicant: ESPRESSIF SYSTEMS (SHANGHAI) CO., LTD., Shanghai (CN)

(72) Inventor: Hangyang Ye, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 377 days.

(21) Appl. No.: 17/778,788

(22) PCT Filed: Nov. 20, 2020

(86) PCT No.: PCT/CN2020/130499
§ 371 (c)(1),
(2) Date: May 20, 2022

(87) PCT Pub. No.: WO2021/098831
PCT Pub. Date: May 27, 2021

(65) Prior Publication Data
US 2022/0398835 A1    Dec. 15, 2022

(30) Foreign Application Priority Data
Nov. 22, 2019    (CN) .......................... 201911153078.6

(51) Int. Cl.
*G06V 10/82* (2022.01)
*G06V 10/77* (2022.01)
(Continued)

(52) U.S. Cl.
CPC .......... *G06V 10/82* (2022.01); *G06V 10/7715* (2022.01); *G06V 10/774* (2022.01); *G06V 10/778* (2022.01); *G06V 2201/07* (2022.01)

(58) Field of Classification Search
None
See application file for complete search history.

(56) References Cited

U.S. PATENT DOCUMENTS 10,423,860 B1 *   9/2019   Kim .................... H04N 7/188
10,970,441 B1 *   4/2021   Zhang ................... G06N 3/063
(Continued)

FOREIGN PATENT DOCUMENTS

CN    108073869 A    5/2018
CN    108549852 A    9/2018
(Continued)

OTHER PUBLICATIONS

Zhang et al., "CMNet: A Connect-and-Merge Convolutional Neural Network for Fast Vehicle Detection in Urban Traffic Surveillance," IEEE Access, vol. 7, p. 72660-72671, May 27, 2019 (Year: 2019).*
(Continued)

*Primary Examiner* — Soo Shin
(74) *Attorney, Agent, or Firm* — Aird & McBurney LP (57) ABSTRACT

A target detection system suitable for an embedded device, comprising an embedded device (5) and a server (6); target detection logic (5.1) running in the embedded device (5) is composed of a multi-layer shared base network, a private base network, and a detection module; a parameter of the shared base network directly comes from an output of an upper layer; and an image is processed by the shared base network and the private base network to obtain a feature map, and after being processed by the detection module, a result merging module merges and outputs a target detection result. The target detection system further comprises an online model self-calibration system. After collecting a sample, the embedded device (5) irregularly uploads the sample to the server (6), and after labeling the sample by means of automatic and manual methods, the server (6) trains a model and updates same to the embedded device (5).

(Continued)

The target detection system can perform well in an embedded device (5), uses a large-scale target detection model on a server (6) to complete automatic labeling which reduces workload, and completes model correction more efficiently.

10 Claims, 6 Drawing Sheets

(51) Int. Cl.
*G06V 10/774* (2022.01)
*G06V 10/778* (2022.01)

(56) References Cited

U.S. PATENT DOCUMENTS

| | | | |
|---|---|---|---|
| 2017/0132334 A1* | 5/2017 | Levinson | B60W 50/00 |
| 2019/0130720 A1* | 5/2019 | Lui | G06V 10/82 |
| 2019/0251433 A1* | 8/2019 | Lin | G06N 3/082 |

FOREIGN PATENT DOCUMENTS

| | | |
|---|---|---|
| CN | 108573238 A | 9/2018 |
| CN | 108710897 A | 10/2018 |
| CN | 109145798 A | 1/2019 |
| CN | 109801265 A | 5/2019 |
| CN | 109919108 A | 6/2019 |
| CN | 110047069 A | 7/2019 |
| CN | 110909794 A | 3/2020 |
| WO | 2019011249 A1 | 1/2019 |

OTHER PUBLICATIONS

International Search Report for PCT Publication No. PCT/CN2020/130499, dated May 27, 2021.
First Office Action with Search Report for CN201911153078.6, dated Apr. 2, 2022.
Zhang et al. "A Connect-and-Merge Convolutional Neural Network for Fast Vehicle Detection in Urban Traffic Surveillance", cited in First Office Action with Search Report for CN201911153078.6.
Han, Kai, "Research on object detection based on deep learning", cited in First Office Action with Search Report for CN201911153078.6.

* cited by examiner

TARGET DETECTION SYSTEM SUITABLE FOR EMBEDDED DEVICE

TECHNICAL FIELD

The disclosure relates to the field of target detection and online correction of embedded devices, in particular to a target detection system suitable for an embedded device.

BACKGROUND ART

The current mainstream methods of target detection are realized based on deep learning. Deep learning methods also present better results than traditional methods, but have some drawbacks in practical applications:
1. Huge amount of calculation requires acceleration by a professional chip (GPU). It is especially disadvantageous for mobile devices, especially embedded devices.
2. A large number of model parameters take up a lot of storage space. It's extremely disadvantageous for resource-constrained embedded devices.

Therefore, such a network can only be deployed on a server, and a terminal device calls an interface of the server through a network to achieve the function of target detection. Once the network is blocked, all functions cannot be realized.

In order to realize offline target detection on terminal devices that is well free from network constraints, the simplest method is to simplify models and obtain a small network model to realize target detection. Although the small network model may reduce the number of parameters and the amount of calculation while shrinking the detection model, making it possible to realize offline target detection in embedded devices, such a network structure will have limited capability of expressing and cannot adapt to all background states. For example, it was found during experiment that the detection rate of the small network model was significantly lower when the target detection was performed in a darker environment.

In addition, when training a small network model, it is prone to miss detection when the images taken by the camera are not consistent with the training set (color saturation, exposure, sharpness, etc.). A solution is to conducting learning using images that are actually collected by a camera. However, it will consume a lot of manpower and material resources to establish the actual data training set, and the cycle is very long. The dataset is too small for the trained network to possess generalization.

SUMMARY OF THE INVENTION

An object of the invention is to provide a target detection system for an embedded device, which has good expressiveness and is capable of using an actual training set for effective model training and correction, mainly solving the problems existing in the above-mentioned prior arts. In order to achieve the above object, the technical solution adopted by the disclosure is to provide a target detection system suitable for an embedded device, wherein the target detection system comprises an embedded device; a local service logic and a target detection logic run on the embedded device;

the target detection logic is composed of a multi-layer structure comprising a plurality of branch modules, and a result merging module; each of the branch modules is composed of a shared base network, a private base network, and a detection module; the shared base network of a first layer of the branch modules accepts a target detection input image; except the first layer of the branch modules, parameters of the shared base networks of the other branch modules all directly come from an output of an upper layer of the shared base network; an output of the shared base network is used as an input of the private base network; the private base network outputs a feature map which is used as an input of the detection module; an output of the detection module is an output of a single layer of the branch modules; the result merging module merges the output of each layer of the branch modules, and outputs a target detection result;

the local service logic takes the target detection result as an input, and utilizes the target detection result to further complete a service.

Further, the shared base network is formed by stacking a plurality of base network blocks; in the shared base network of the first layer of the branch modules, the first layer of the base network blocks is a CNN network block, and the remaining base network blocks are MobileNet network blocks; in the shared base networks of other layers of the branch modules, all the base network blocks are MobileNet network blocks; in the shared base network, a number of MobileNet network blocks dynamically increases or decreases with a target difficulty.

Further, the private base network is formed by stacking a plurality of MobileNet network blocks, the number of the MobileNet network blocks dynamically increasing or decreasing with the expressiveness; the parameters of the private base network are only valid for a current branch module.

Further, the detection module divides the feature map into a first branch, a second branch, and a third branch; the first branch is composed of one MobileNet network block, the second branch is composed of two MobileNet network blocks, and the third branch is composed of three MobileNet network blocks;

after passing through the first branch and the third branch, a number of feature dimensions of the feature map remains unchanged; after passing through the second branch, the number of feature dimensions of the feature map doubles; the detection module merges the feature maps of the first branch, the second branch, and the third branch, and obtains a score, a detection box, and a key point through convolution as an output of a current layer of the branch modules.

Further, the target detection system further comprises a server and an online model self-calibration system; the online model self-calibration system comprises a sample collection logic running on the embedded device and a sample annotation module and a model correction module running on the server;

after collecting the samples, the sample collection logic saves the samples in a sample library, and uploads the sample library to the server from time to time;

the sample annotation module completes annotation of the images in the sample library to form an annotated sample library, and then utilizes the annotated sample library to complete calibration of model network parameters through the model correction module, and delivers the calibrated model network parameters and updates the same to the embedded device.

Further, the sample collection function of the sample collection logic is activated in the form of timed trigger or service trigger; the triggered sample collection logic performs the following steps:

Step 1.1) setting a detection result queue to be empty;

Step 1.2) acquiring a new frame of image, performing target detection, and sending the image and the detection result of the image to the detection result queue at the same time;

Step 1.3) in the detection result queue, taking the image with a last detection result of "object detected" as a starting point, and scanning towards a tail of the queue, if an image with a next detection result of "object detected" is encountered, then taking the image as an end point, and jump to step 1.4, otherwise jump to step 1.2;

Step 1.4) counting a number Z of the images with the detection result of "no object detected" in an interval from the starting point to the ending point in step 1.3;

Step 1.5) if Z is greater than $Z_{threshold}$, go back to step 1.1. If Z is less than or equal to $Z_{threshold}$, a frame is extracted from Z frames of the image and stored in the sample library, and the sample collection is ended.

Further, a specified capacity of the sample library of the sample collection logic is N, and when a number of existing samples in the sample library is greater than or equal to the specified capacity N, new samples replace oldest samples in the sample library;

after receiving the sample library uploaded by the embedded device, the server deletes duplicate images in the sample library by calculating a similarity of the images in the sample library.

Further, the sample annotation operation performed by the sample annotation module includes the following steps:

Step 2.1) extracting an image from the sample library, sending the image to a plurality of super-large networks at the same time for target identification, and obtaining a target recognition result;

Step 2.2) calculating a difficulty factor λ of the image by utilizing the target identification result;

Step 2.3) if the difficulty factor λ corresponding to the image is less than or equal to a difficulty threshold $λ_{threshold}$, classify the image as a second-level difficult sample; for the second-level difficult sample, remove the image from the sample library, and complete automatic annotation by combining the target identification results of the plurality of super-large networks, and then add the image into the annotated sample library;

Step 2.4) if the difficulty factor λ corresponding to the image is greater than the difficulty threshold $λ_{threshold}$, classify the image as a first-level difficult sample; for the first-level difficult sample, remove the image from the sample library and save the image separately, and complete manual annotation; after manual annotation, add the image into the annotated sample library;

Step 2.5) if there is still any unprocessed image in the sample library, go back to step 2.1, otherwise the sample annotation operation is completed.

Further, step 2.2 specifically includes the following sub-steps:

Step 2.2.1) selecting the target identification result of one of the super-large networks as a benchmark result;

Step 2.2.2) calculating an IoU (Intersection over Union) of the detection box in the target identification result of other super-large networks and the detection box in the benchmark result;

Step 2.2.3) for each of the super-large networks, select the target identification result with a largest IoU and an IoU value being greater than the threshold $C_{threshold}$ from the plurality of target identification results outputted, and group the same and the corresponding benchmark result into a group; each of the target identification results that cannot be grouped is formed as a group independently;

Step 2.2.4) calculating the difficulty factor λ, wherein:

$$\lambda = \frac{\sum_{i=1}^{k} |N_i - \hat{N}|}{(\hat{N} - 1) \times \sum_{i=1}^{k} N_i}, \lambda \in [0, 1]$$

Step 2.3 is expanded to the following steps:

Step 2.3.1) if the difficulty factor λ, corresponding to the image is less than or equal to the difficulty threshold $λ_{threshold}$, classify the image as the second-level difficult sample;

Step 2.3.2) removing the image from the sample library;

Step 2.3.3) for the second-level difficult sample, the corresponding independent groups of the target identification results are discarded, and an average value of the detection boxes in the non-independently grouped target identification results is calculated as a final annotation of a sample to complete automatic annotation.

Further, operations of the model correction module include the following steps:

Step 3.1) dividing the annotated sample library into an actual training set and an actual verification set; using publicly obtained general samples as a public verification set;

Step 3.2) calculating LOSS values of an original model in the public validation set and the actual validation set, respectively;

Step 3.3) dividing the actual training set into multiple groups, and using the original model as a pre-training model;

Step 3.4) selecting a group of data in the actual training set;

Step 3.5) performing model training on the pre-training model to obtain a post-training model;

Step 3.6) calculating LOSS values of the post-training model in the public verification set and the actual verification set, respectively;

Step 3.7) if a difference between the LOSS values of the original model and the post-training model in the public validation set is greater than a threshold $L_{threshold}$, and a difference between the LOSS values thereof in the actual validation set is greater than a threshold $I_{threshold}$, jump to step 3.8, otherwise go to step 3.9;

Step 3.8) if there are still data not having participated in the training in the actual training set, set the post-training model as a new pre-training model, and jump to step 3.4, otherwise go to step 3.9;

Step 3.9) stopping training; after the training is stopped, use network parameters of the post-training model as an output of the model correction module.

The disclosure reduces the overall network parameters and the amount of calculation by utilizing shared parameters among the shared base networks and dynamically adjustable number of layers of the shared base networks and the private base networks.

The model correction system included in the disclosure collects the difficult samples encountered by the embedded device in the current environment, submits the same to the server from time to time, realizes automatic annotation of the samples by utilizing the large target detection model of the server, and then trains and updates the network model of the embedded device by utilizing the annotated samples.

In view of the above technical features, the disclosure has the following advantages:

1) Not limited by the resource shortage and limited computing speed of embedded devices, it can still achieve good performance in embedded devices.
2) The sample library does not need to be uploaded in real time, which greatly reduces the network dependence of embedded devices.
3) Automatic annotation of the large target detection model on the server reduces the workload of manual annotation.
4) Embedded devices can utilize the results of the large target detection model on the server to update their own model network parameters, and complete model upgrades more efficiently.

Symbols in the figures: 1—branch module, 1.1—shared base network, 1.2—private base network, 1.3—detection module, 2—result merging module, 3.1—network block, 3.2—optional network block, 4.1—first branch, 4.2—second branch, 4.3—third branch, 5—embedded device, 5.1—target detection logic, 5.2—local service logic, 5.3—sample collection logic, 6—server, 6.1—sample annotation module, 6.2—model correction module, 7—sample library, 8—network model parameter, 9—faster-RCNN network, and 10—SSD network 10.

DETAILED DESCRIPTION OF THE PREFERRED EMBODIMENTS

The disclosure will be further described in the following with reference to the specific embodiments. It should be understood that these embodiments are only used to illustrate the disclosure and not to limit the scope of the disclosure. In addition, it should be understood that those skilled in the art can make various changes or modifications to the disclosure after reading the content taught by the disclosure, and these equivalent forms also fall within the scope defined by the appended claims of the disclosure.

Figure 1:
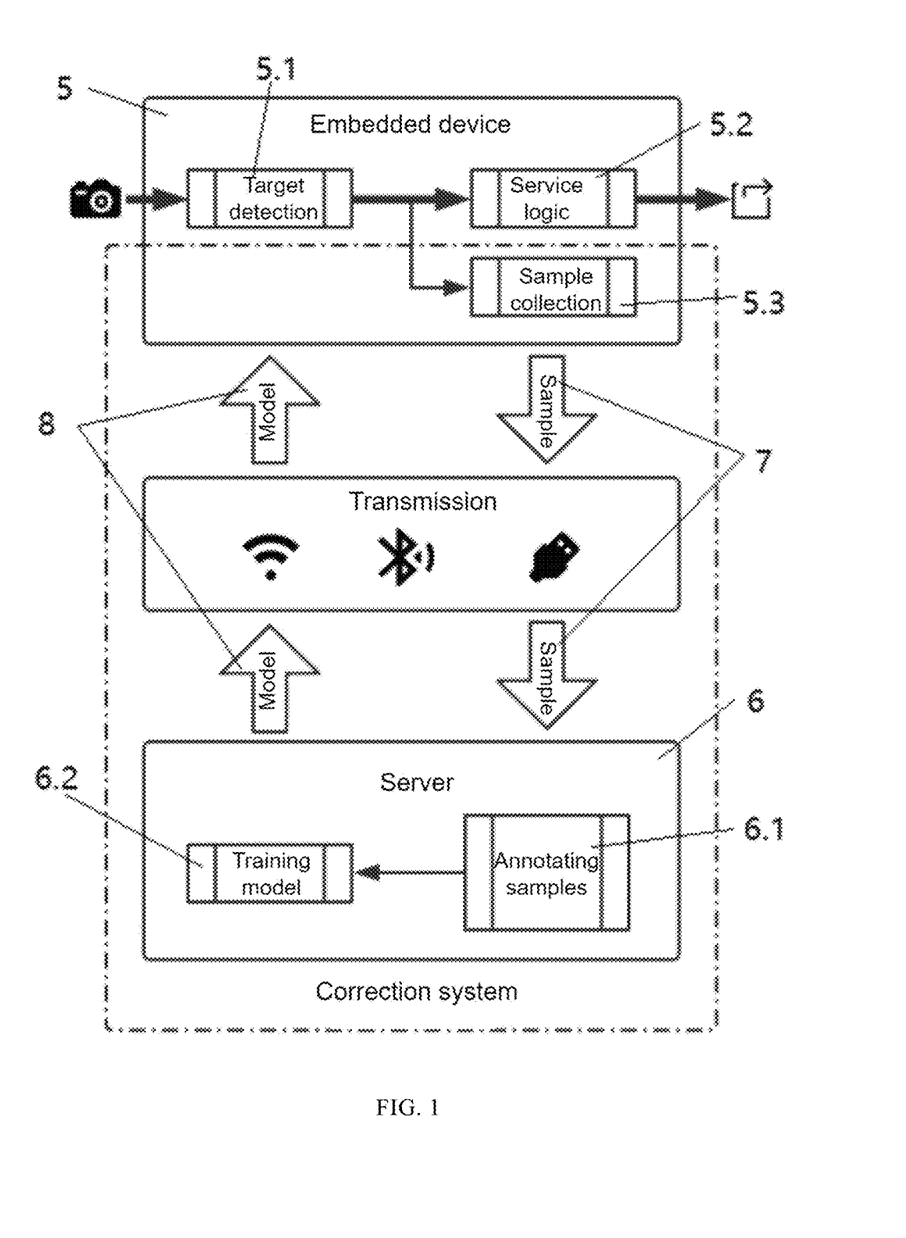
FIG. 1 is a system structural diagram of a preferred embodiment in the disclosure.

Please refer to FIG. 1, a target detection system suitable for an embedded devices in the disclosure comprises an embedded device 5 and a server 6. A remote service logic is running on the server 6; a target detection logic 5.1 and a local service logic 5.2 operate on the embedded device 5. The target detection logic 5.1 comprises a deep learning network model.

The target detection system suitable for an embedded device in the disclosure further comprises an online model self-calibration system, which may be used to solve the problem of reduced learning capability because the small model reduces the number of parameters in order to reduce the amount of calculation. The online self-calibration system comprises a sample collection logic 5.3 running on the embedded device 5, and a sample annotation module 6.1 and a model correction module 6.2 running on the server 6; On the embedded device 5, all the actually collected images enter the target detection logic 5.1, and the detection results of the target detection logic 5.1 are sent to the local service logic 5.2 and the sample collection logic 5.3, respectively. The local service logic 5.2 completes service-related logic, and the sample collection logic 5.3 serves as a part of the online self-calibration system, where samples are collected in a controlled manner and added into a sample library 7 in preparation for subsequent calibration.

The samples in the sample library 7 may be transmitted to the server 6 by various means such as Bluetooth, Wi-Fi, etc.

After the sample library 7 is uploaded to the server 6, the duplicate images are deleted by calculating the similarity between the images, and enters the sample annotation module 6.1. The annotated samples are used as training set and test set, and enter the model correction module 6.2 to train new target detection network model parameters 8, and then the updated network model parameters 8 are deployed in the embedded device 5.

Figure 2:
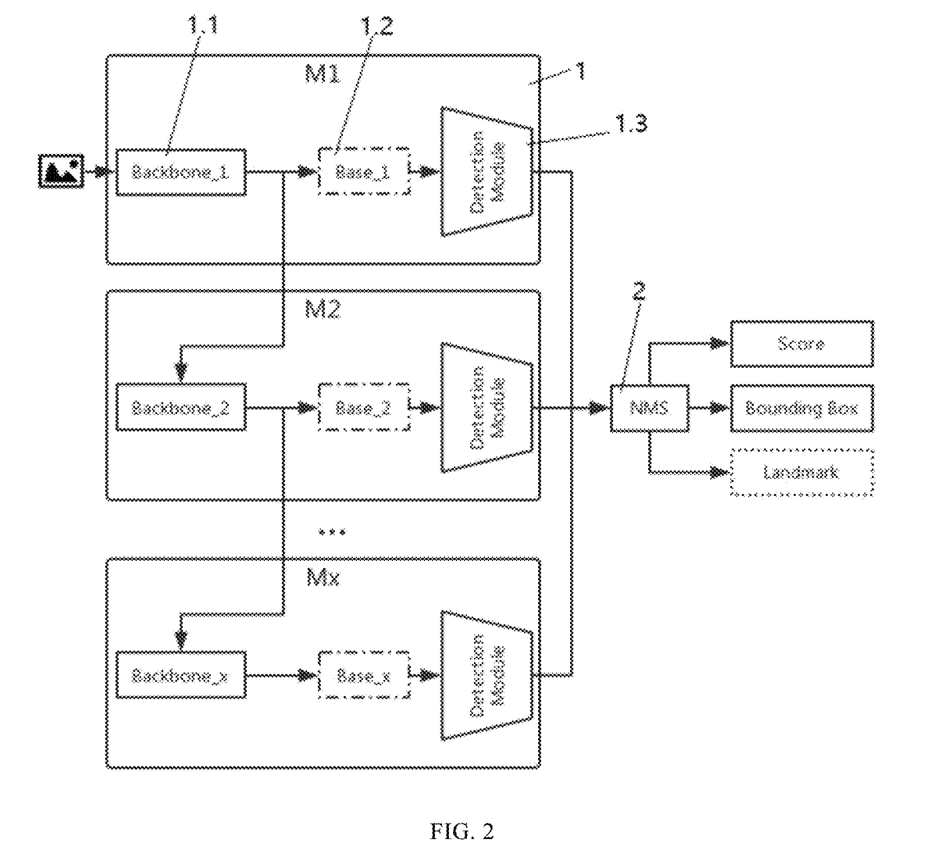
FIG. 2 is a network structural diagram of a deep learning network in a preferred embodiment in the disclosure.

Please refer to FIG. 2, the deep learning network model in the target detection logic consists of a multi-layer structure comprising a plurality of branch modules 1, and a result merging module 2. The network consists of several branch modules 1: M1, M2 . . . Mx. Each branch module 1 corresponds to one or more anchors. For example, the following design may be provided: (1) the number of branch modules is 2, namely M1, M2; (2) M1 corresponds to an anchor size of 16×16; (3) M2 corresponds to two anchor sizes (32×32, 64×56), and finally the model can detect objects approximately of the set anchor sizes.

Each branch module 1 is composed of three major components: a shared base network 1.1, a private base network 1.2, and a detection module 1.3.

1) Shared base network 1.1 is formed by stacking of MobileNet network blocks. MobileNet is a network structure suitable for mobile devices, which greatly reduces the amount of calculation and the number of parameters compared with CNN, while having the "scaling" feature of CNN at the same time. Here, the design of the shared base network 1.1 (backbone_1) of the first layer is different from that of the shared base networks 1.1 of other layers: the first layer of network uses CNN in order to prevent MobileNet from losing too many features.

The function of the shared base network 1.1 is mainly to determine the scaling ratio of the branch module through a stride. Taking the design of backbone_1 as an example, the stride is multiplied to 8, that is, the feature map obtained by the branch module is ⅛ of the original image in size. When the detected object is relatively large, a larger stride may be used, which can quickly diminish the size of the feature map and reduce the number of parameters and the amount of calculation.

The shared base networks 1.1 of the shallower layers share parameters with the shared base networks 1.1 of the deeper layers, reducing overall parameters and the amount of calculation of the network. For example, the output of backbone_1 becomes the input of backbone_2, and the output of backbone_2 becomes the input of backbone_3, and so on.

2) The private base network 1.2 is also formed by stacking of MobileNets. Unlike the shared base network 1.1, the parameters of the private base network 1.2 are only valid for the current module and are not affected by other modules.

The private base network 1.2 can also be increased or decreased based on the actual detection effect. When the expressiveness is too poor, the network layers can be appropriately increased to improve the expressiveness; when the expressiveness is acceptable, the network can be appropriately reduced to increase the speed.

3) The detection module 1.3 improves the detection effect of the model by fusing the feature maps of different receptive fields.

The result merging module 2 of the target detection logic gathers the detection boxes predicted by all branch modules, and removes the redundant detection boxes through NMS to obtain the final prediction result.

Figure 3:
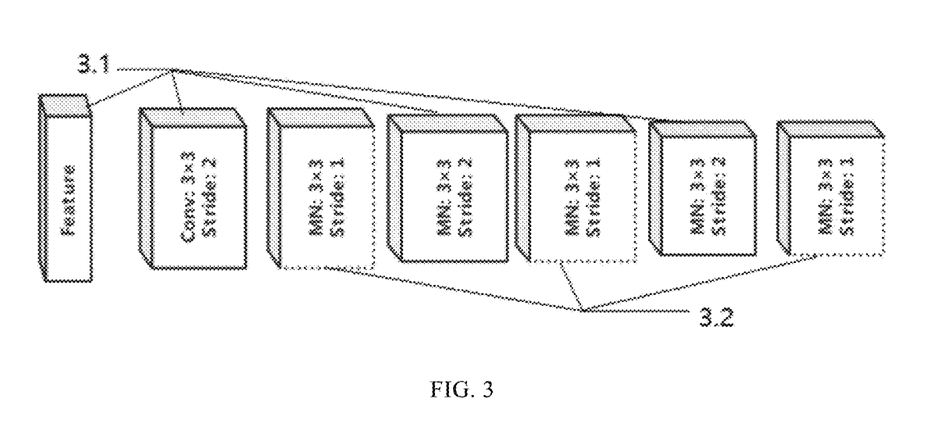
FIG. 3 is a structural representation of a shared base network in a preferred embodiment in the disclosure.

Please refer to FIG. 3. The shared base network is formed by stacking a plurality of network blocks 3.1, in which the convolution corresponding to the dotted box is an optional network block 3.2. The optional network block 3.2 can be increased or decreased depending on the difficulty of detecting the detected object. If the detected object is difficult to detect, or there are many false detections, the optional network blocks 3.2 can be added; otherwise, remove the optional network blocks 3.2.

Figure 4:
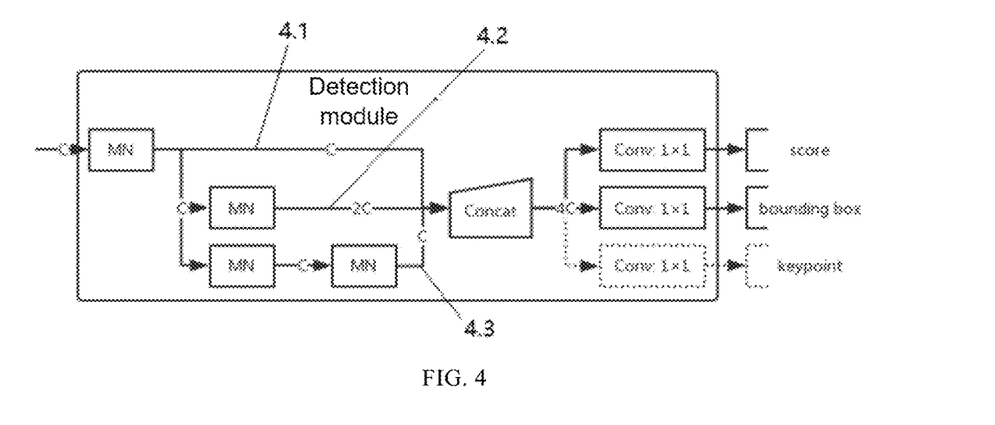
FIG. 4 is a structural representation of a detection module in a preferred embodiment in the disclosure.

Please refer to FIG. 4. The input feature map enters from the input end of the detection module, with information of C dimensions. After entering the module, the feature map will be divided into the first branch 4.1, the second branch 4.2, and the third branch 4.3. For the feature map on the second branch 4.2, after passing through two MobileNet modules, the number of dimensions of the feature map is increased from C to 2C. The receptive field of the second branch 4.2 is between the upper and lower branches, and the number of its dimensions is increased to make it the main feature information. The features of the first branch 4.1 and the third branch 4.3 serve as auxiliary information. Finally, the information of the three branches is joined together to form a new feature map. The new feature map is obtained by passing through different 1×1 convolutions respectively to obtain scores and detection boxes. An additional 1×1 convolution is added to obtain a key point, if the key point is required.

Figure 5:
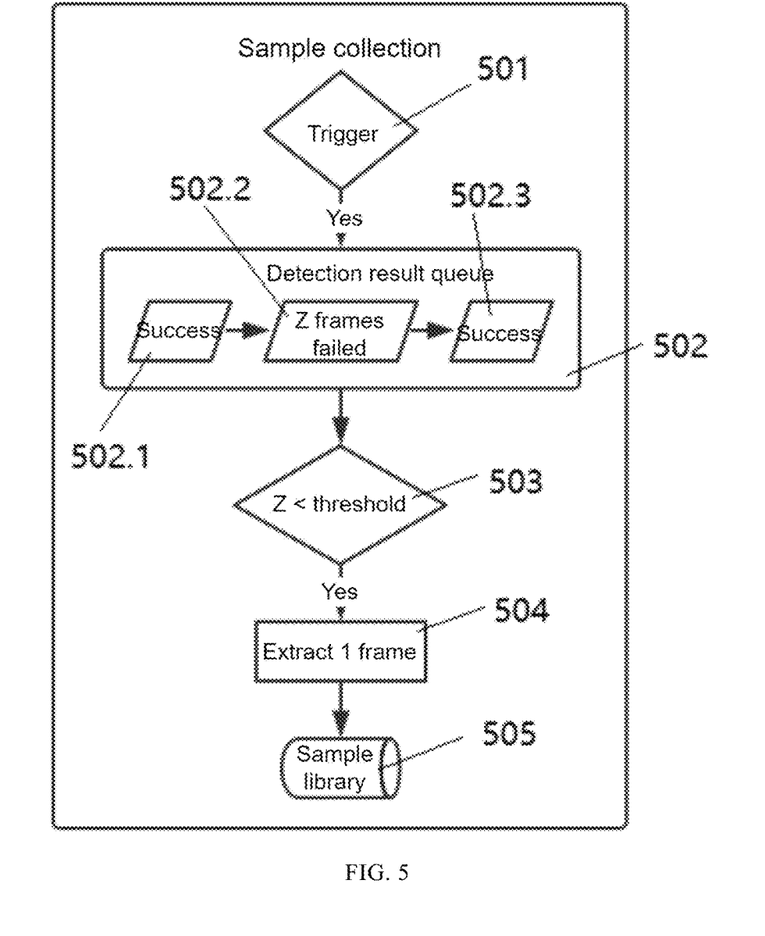
FIG. 5 is a flow chart of a sample collection logic in a preferred embodiment in the disclosure.

Please refer to FIG. 5. The sample collection logic running on the embedded device is triggered and activated by a customized condition. For example, it can be triggered at regular intervals where the sample collection logic may be activated once an hour, or it may be triggered by service, for example, when the device is performing face entry, if an image of "no object detected" is shown, there is high probability of missed detection, then the sample collection logic is activated. The workflow of the sample collection logic includes the following steps:

Step 501) the sample collection logic is triggered.
Step 502) sending the detection result of each frame to the "detection result queue", and calculating a number Z of consecutively failed frames, which specifically includes:
Step 502.1) starting with the last time of object detected;
Step 502.2) recording the number of frames where no object is detected;
Step 502.3) ending with the next time of object detected, and counting the total number of frames where no object is detected.
Step 503) setting threshold $Z_{threshold}$, when Z is greater than $Z_{threshold}$, it is judged that there is no object in the Z frames of images, the sample collection logic ends; when Z is less than $Z_{threshold}$, it is judged that object detection is missed in the Z frames of images, go to step 504.
Step 504) extracting 1 frame from the Z frames missed in the detection.
Step 505) save this frame of image into the sample library, and the sample collection logic ends.

Here, the size of the sample library will be limited, and when the limit is exceeded, new samples will replace the oldest samples. It is ensured that it does not take up too much storage resource and ensure the freshness of the sample data, which can better reflect the recent environmental conditions.

Figure 6:
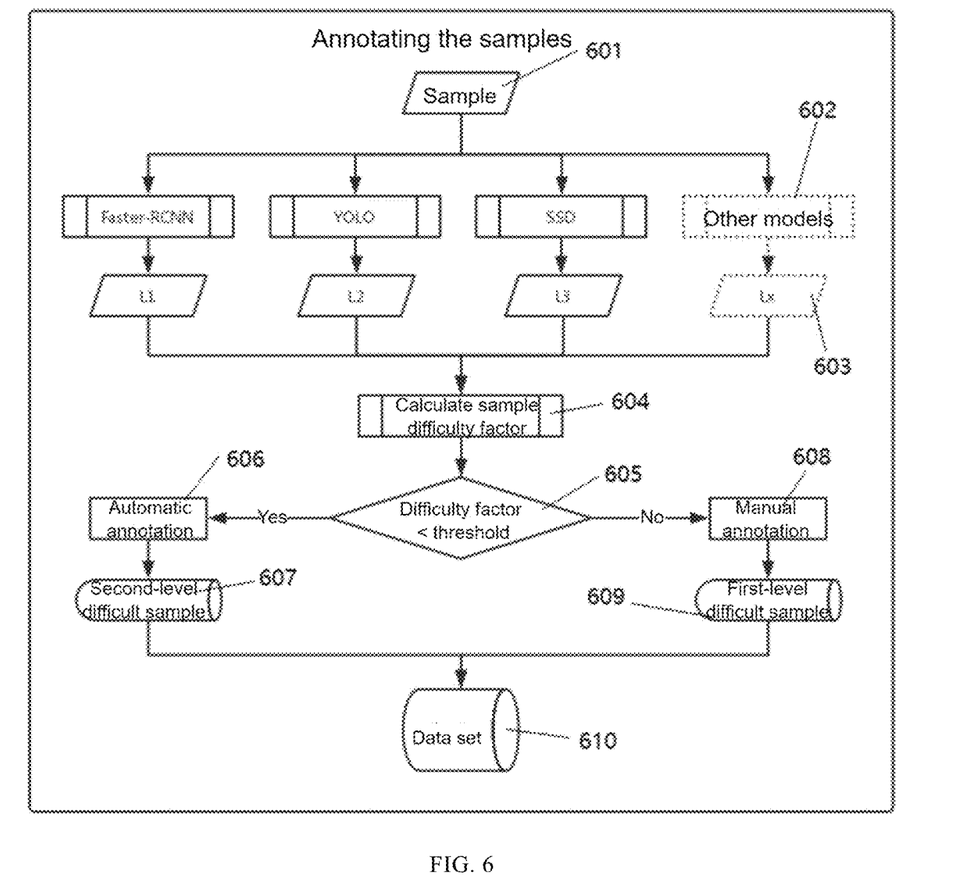
FIG. 6 is a flow chart of a sample annotation module in a preferred embodiment in the disclosure.

Please refer to FIG. 6. The sample annotation module running on the server performs automatic or manual annotation on each frame of collected image in the sample library, with the specific following steps:

Step 601) each frame of image in the sample library enters the sample annotation module;
Step 602) the image samples are sent into a plurality of super-large networks, such as YOLO, SSD, Faster-RCNN, etc.
Step 603) obtaining the results $L_1$, $L_2$ to $L_X$ respectively.
Step 604) combining the results of the plurality of super-large networks ($L_1$, $L_2$ to $L_X$), and calculating the image difficulty factor $\lambda$.
Step 605) if the difficulty factor $\lambda$ is less than or equal to a difficulty threshold $\lambda_{threshold}$, go to step 606; if the difficulty factor $\lambda$ is greater than the difficulty threshold $\lambda_{threshold}$, go to step 608.
Step 606) completing automatic annotation of the images is by combining the target identification results of the plurality of super-large networks.
Step 607) classifying the image as a second-level difficult sample and adding it into the annotated sample library, go to step 610.
Step 608) submitting the image for manual processing to complete manual annotation of the image.
Step 609) classifying the image as a first-level difficult sample and adding it into the annotated sample library.
Step 610) forming a dataset.

In this way, it is made possible to quickly collect difficult sample data sets, and at the same time ensure the correctness of sample annotation. In the end, the dataset contains both automatically annotated and manually annotated image samples.

Here, in step 604, the specific process of calculating the sample difficulty factor is to group first, and then obtain the result based on the grouping information. Here, the steps of grouping include:

Step 701) obtaining the target identification results of each super-large network.
Step 702) selecting the target identification result of one of the super-large networks as the benchmark group (that is, each detection box is used as the benchmark detection box of a group), and classifying the target identification results of the remaining super-large networks as to be classified.
Step 703) selecting an super-large network to be classified, taking its target identification result, and calculating the IoU values between a plurality of detection boxes and the benchmark detection box thereof.

Step 704) selecting the detection box with a largest IoU value among the plurality of detection boxes to be classified. If the IoU value of this detection box is greater than the threshold $C_{threshold}$, the current detection box is incorporated into the group where the benchmark detection box is located. The detection boxes that cannot be grouped are grouped individually.

Step 705) if there is still an unprocessed super-large network, go to step 703. Otherwise, end the process.

Figure 7:
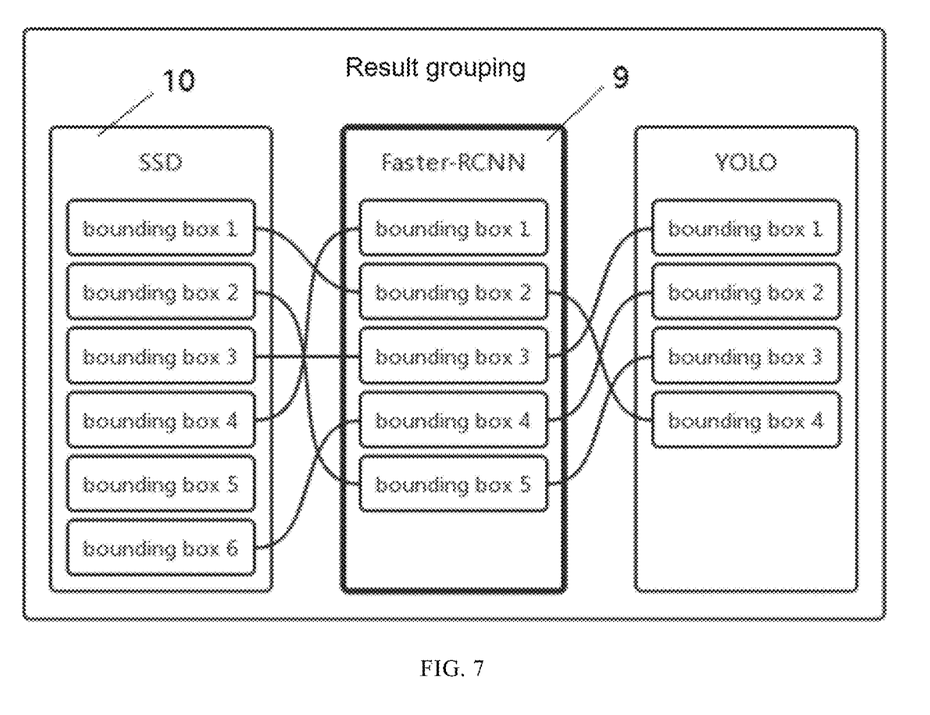
FIG. 7 is a grouping example diagram of calculating difficulty factor in a preferred embodiment in the disclosure.

Please refer to FIG. 7 for a specific grouping example. In this example, the result of the Faster-RCNN network 9 is used as the benchmark group. The IoU of the detection box 1 of the SSD network 10 and the detection boxes 1 to 5 of the Faster-RCNN network 9 are calculated, respectively. Finally, it is found that the IoU of the detection box 2 of the Faster-RCNN network 9 is the largest and greater than $C_{threshold}$, so the detection box 1 of the SSD network 10 and the detection box 2 of the Faster-RCNN network 9 are grouped together, and so on. The detection box 5 of the SSD network 10 cannot be grouped, so it becomes an independent group.

After the grouping is completed, the number of detection boxes in each group is counted, annotating them as $N_1$ to $N_k$. The difficulty factor $\lambda$ is calculated according to the following formula:

$$\lambda = \frac{\sum_{i=1}^{k} |N_i - \hat{N}|}{(\hat{N} - 1) \times \sum_{i=1}^{k} N_i}, \lambda \in [0, 1]$$

in which $\hat{N}$ is the number of super-large networks. Taking FIG. 7 as an example, it can be obtained that $\lambda=0.1$.

In step 606, the specific process of automatic annotation of the image is to firstly discard the detection boxes of the independent groups, and then use the average value of the detection boxes of the non-independent groups as the final annotation of the image sample. The expression is as follows:

$$\hat{x} = \frac{\sum_{i=1}^{\hat{N}} x_i}{\hat{N}}, \hat{y} = \frac{\sum_{i=1}^{\hat{N}} y_i}{\hat{N}}, \hat{w} = \frac{\sum_{i=1}^{\hat{N}} w_i}{\hat{N}}, \hat{h} = \frac{\sum_{i=1}^{\hat{N}} h_i}{\hat{N}}$$

in which $\hat{N}$ is the number of super-large networks, and x, y, w, and h respectively represent the abscissa and ordinate of the upper left corner of the detection box, the width and height of the detection box.

Figure 8:
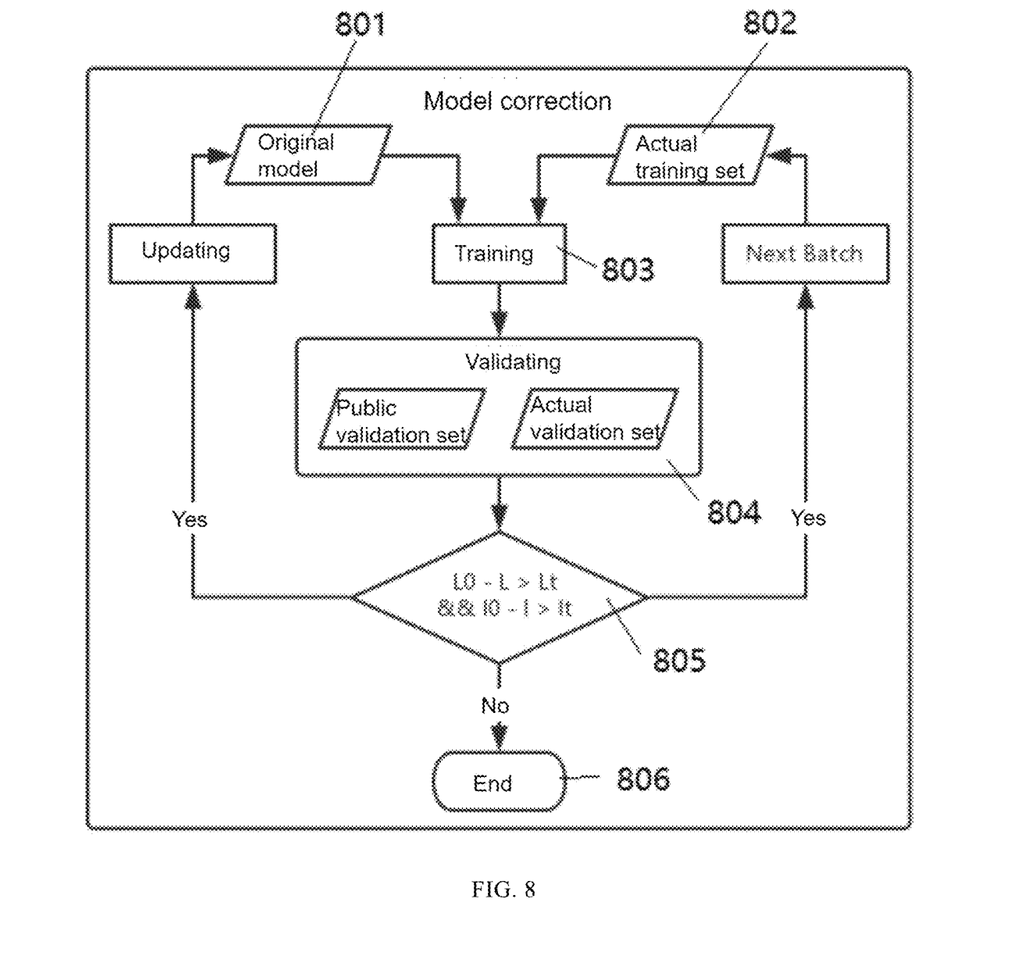
FIG. 8 is a flow chart of a model correction module in a preferred embodiment in the disclosure.

Please refer to FIG. 8. The original model is fine-tuned by utilizing the annotated samples, in order to fit the current environment. The dataset generated by the annotated samples is divided into an actual training set and an actual validation set, and the public dataset is used as the public validation set. The training data is in batch as the smallest unit.

The calibration process includes the following steps:

Step 801) preparing an original model (the model after the last correction, or the initial model if the correction is performed for the first time) and calculating the Loss value of the original model on the public validation set and the actual validation set, $L_0$ and $I_0$.

Step 802) prepare a batch of actual training sets, and go to step 803. If all the samples in the actual training set have been traversed, stop training, and jump to step 806.

Step 803) starting training.

Step 804) after each batch of training, calculate the Loss value of the post-training model on the public validation set and the actual validation set, L and I.

Step 805) if $L_0 - L > L_{Threshold}$ and $I_0 - I > I_{Threshold}$, it is regarded as a valid training, update the network parameters of the model, and jump to step 801; otherwise, stop the iteration and go to step 806.

Step 806) the calibration is completed, and new model network data is generated.

On the embedded device, the first initial model may be built using open source datasets. Open source datasets usually cover a variety of scenarios with high richness. The model trained with such data can adapt to each scenario relatively evenly. This initial model will be deployed to the device first. During service operation, the embedded device utilizes the online model self-calibration system to update image samples to the server from time to time, and the model network parameters corrected by the online self-calibration system are sent back to the embedded device by the server through Bluetooth, Wi-Fi and other means to update the network parameters in the device.

The above described are only preferred embodiments of the disclosure, and are not intended to limit the scope of the disclosure. Any equivalent structure or equivalent process transformation made by utilizing the contents of the description and drawings of the disclosure, or directly or indirectly applied to other related technical fields are all similarly included in the scope of patent protection of the disclosure.

The invention claimed is:

1. A target detection system suitable for an embedded device, wherein the target detection system comprises an embedded device; a local service logic and a target detection logic run on the embedded device;

the target detection logic is composed of a multi-layer structure comprising a plurality of branch modules, and a result merging module; each of the branch modules is composed of a shared base network, a private base network, and a detection module; the shared base network of a first layer of the branch modules accepts a target detection input image; except the first layer of the branch modules, parameters of the shared base networks of each of other branch modules all directly come from an output of an upper layer of the shared base network; an output of the shared base network is used as an input of the private base network; the private base network outputs a feature map which is used as an input of the detection module; an output of the detection module is an output of a single layer of the branch modules; the result merging module merges the output of each layer of the branch modules, and outputs a target detection result; and the local service logic takes the target detection result as an input, and utilizes the target detection result to further complete a service.

2. The target detection system of claim 1, wherein the shared base network is formed by stacking a plurality of base network blocks; in the shared base network of the first layer of the branch modules, the first layer of the base network blocks is a CNN network block, and the remaining base network blocks are MobileNet network blocks; in the shared base networks of other layers of the branch modules, all the base network blocks are MobileNet network blocks; in the shared base network, a number of MobileNet network blocks dynamically increases or decreases with a target difficulty.

3. The target detection system of claim 1, wherein the private base network is formed by stacking a plurality of MobileNet network blocks, the number of the MobileNet network blocks dynamically increasing or decreasing with an expressive power of the private base network; parameters of the private base network are only valid for a current branch module.

4. The target detection system of claim 1, wherein the detection module divides the feature map into a first branch, a second branch, and a third branch; the first branch is composed of one MobileNet network block, the second branch is composed of two MobileNet network blocks, and the third branch is composed of three MobileNet network blocks;

after passing through the first branch and the third branch, a number of feature dimensions of the feature map remains unchanged; after passing through the second branch, the number of feature dimensions of the feature map doubles; the detection module merges the feature maps of the first branch, the second branch, and the third branch, and obtains a score, a detection box, and a key point through convolution as an output of a current layer of the branch modules.

5. The target detection system of claim 1, wherein the target detection system further comprises a server and an online model self-calibration system; the online model self-calibration system comprises a sample collection logic running on the embedded device and a sample annotation module and a model correction module running on the server;

after collecting the samples, the sample collection logic saves the samples in a sample library, and uploads the sample library to the server irregularly; and the sample annotation module completes annotation of the images in the sample library to form an annotated sample library, and then utilizes the annotated sample library to complete calibration of model network parameters through the model correction module, and delivers the calibrated model network parameters and updates the same to the embedded device.

6. The target detection system of claim 5, wherein a sample collection function of the sample collection logic is activated in the form of timed trigger or service trigger; the triggered sample collection logic performs the following steps:

Step 1.1) setting a detection result queue to be empty;

Step 1.2) acquiring a new frame of image, performing target detection, and sending the image and the detection result of the image to the detection result queue at the same time;

Step 1.3) in the detection result queue, take the image with a last detection result of "object detected" as a starting point, and scan towards a tail of the queue, if an image with a next detection result of "object detected" is encountered, then take the image as an end point, and jump to step 1.4, otherwise jump to step 1.2;

Step 1.4) counting a number Z of the images with the detection result of "no object detected" in an interval from the starting point to the ending point in step 1.3;

Step 1.5) if Z is greater than $Z_{threshold}$, go back to step 1.1 if Z is less than or equal to $Z_{threshold}$, a frame is extracted from Z frames of the image and stored in the sample library, and the sample collection is ended.

7. The target detection system of claim 5, wherein a specified capacity of the sample library of the sample collection logic is N, and when a number of existing samples in the sample library is greater than or equal to the specified capacity N, a new sample replaces an oldest sample in the sample library;

after receiving the sample library uploaded by the embedded device, the server deletes duplicate images in the sample library by calculating a similarity of the images in the sample library.

8. The target detection system of claim 5, wherein sample annotation operation performed by the sample annotation module comprises the following steps:

Step 2.1) extracting an image from the sample library, sending the image to a plurality of super-large networks at the same time for target identification, and obtaining a target recognition result;

Step 2.2) calculating a difficulty factor $\lambda$ of the image by utilizing the target identification result;

Step 2.3) if the difficulty factor $\lambda$ corresponding to the image is less than or equal to a difficulty threshold $\lambda_{threshold}$, classify the image as a second-level difficult sample; for the second-level difficult sample, remove the image from the sample library, and complete automatic annotation by combining the target identification results of the plurality of super-large networks, and then add the image into the annotated sample library; wherein the super-large network is selected from at least one of YOLO, SSD, and Faster-RCNN;

Step 2.4) if the difficulty factor $\lambda$ corresponding to the image is greater than the difficulty threshold $\lambda_{threshold}$, classify the image as a first-level difficult sample; for the first-level difficult sample, remove the image from the sample library and save the image separately, and complete manual annotation; after manual annotation, add the image into the annotated sample library;

Step 2.5) if there is still any unprocessed image in the sample library, go back to step 2.1, otherwise the sample annotation operation is completed.

9. The target detection system of claim 8, wherein,

Step 2.2 specifically includes the following sub-steps:

Step 2.2.1) selecting the target identification result of one of the super-large networks as a benchmark result;

Step 2.2.2) calculating an IoU of the detection box in the target identification result of other super-large networks and the detection box in the benchmark result;

Step 2.2.3) for each of the super-large networks, select the target identification result with a largest IoU and the IoU value being greater than a threshold $C_{threshold}$ from the plurality of target identification results outputted, and group the same and the corresponding benchmark result into a group; each of the target identification results that cannot be grouped is formed as a group independently;

Step 2.2.4) calculating the difficulty factor $\lambda$, wherein:

$$\lambda = \frac{\sum_{i=1}^{k} |N_i - \hat{N}|}{(\hat{N} - 1) \times \sum_{i=1}^{k} N_i}, \lambda \in [0, 1]$$

Step 2.3 is expanded to the following steps:

Step 2.3.1) if the difficulty factor A corresponding to the image is less than or equal to the difficulty threshold $\lambda_{threshold}$, classify the image as the second-level difficult sample;

Step 2.3.2) removing the image from the sample library;

Step 2.3.3) for the second-level difficult sample, the corresponding independent groups of the target identification results are discarded, and an average value of the detection boxes in the non-independently grouped target identification results is calculated as a final annotation of a sample to complete automatic annotation.

10. The target detection system of claim 5, wherein the operation of the model correction module comprises the following steps:
- Step 3.1) dividing the annotated sample library into an actual training set and an actual verification set; using publicly obtained general samples as a public verification set;
- Step 3.2) calculating LOSS values of an original model in the public validation set and the actual validation set, respectively;
- Step 3.3) dividing the actual training set into multiple groups, and using the original model as a pre-training model;
- Step 3.4) selecting a group of data in the actual training set;
- Step 3.5) performing model training on the pre-training model to obtain a post-training model;
- Step 3.6) calculating LOSS values of the post-training model in the public verification set and the actual verification set, respectively;
- Step 3.7) if a difference between the LOSS values of the original model and the post-training model in the public validation set is greater than a threshold $L_{threshold}$, and a difference between the LOSS values thereof in the actual validation set is greater than a threshold $I_{threshold}$, jump to step 3.8, otherwise go to step 3.9;
- Step 3.8) if there are still data not having participated in the training in the actual training set, set the post-training model as a new pre-training model, and jump to step 3.4, otherwise go to step 3.9;
- Step 3.9) stopping training; after the training is stopped, use network parameters of the post-training model as an output of the model correction module.

\* \* \* \* \*